United States Patent [19]

Gabriel

[11] 4,129,975
[45] Dec. 19, 1978

[54] CONSTRUCTION SET HAVING CLIP FASTENERS

[75] Inventor: Richard J. Gabriel, Portland, Oreg.

[73] Assignee: Matrix Toys, Inc., Portland, Oreg.

[21] Appl. No.: 843,580

[22] Filed: Oct. 19, 1977

Related U.S. Application Data

[63] Continuation-in-part of Ser. No. 775,916, Mar. 9, 1977, abandoned.

[51] Int. Cl.² ............................................. E04H 12/10
[52] U.S. Cl. .................................... 52/648; 46/29; 46/30; 52/650; 403/171
[58] Field of Search .................... 52/81, DIG. 2, 282, 52/648, 650; 403/297, 248, 251, 316, 176, 171; 46/29, 31

[56] References Cited

U.S. PATENT DOCUMENTS

| 798,706 | 9/1905 | Rockwell | 403/297 |
|---|---|---|---|
| 1,054,341 | 2/1913 | Cowles | 52/DIG. 10 |
| 1,920,021 | 7/1933 | Schroder | 46/29 |
| 2,057,942 | 10/1936 | Fay | 52/DIG. 10 |
| 2,149,476 | 3/1939 | Tetzlaff | 46/29 |
| 2,780,484 | 2/1957 | Frye | 52/DIG. 10 |
| 2,799,118 | 7/1957 | Lullo | 46/29 |
| 3,093,259 | 6/1963 | Morrison | 52/DIG. 10 |
| 3,343,324 | 9/1967 | Gordon | 52/403 |
| 3,363,361 | 1/1968 | Helfer | 46/31 |
| 3,600,825 | 8/1971 | Pearce | 403/176 |
| 3,982,841 | 9/1976 | Endzweig | 403/171 |
| 4,012,155 | 3/1977 | Morris | 46/29 |
| 4,054,393 | 10/1977 | Talleri | 46/29 |

FOREIGN PATENT DOCUMENTS

| 539143 | 10/1930 | Fed. Rep. of Germany | 403/171 |
|---|---|---|---|
| 1104412 | 4/1961 | Fed. Rep. of Germany | 46/29 |
| 2416243 | 10/1975 | Fed. Rep. of Germany | 52/648 |
| 2436628 | 4/1976 | Fed. Rep. of Germany | 52/648 |

Primary Examiner—Price C. Faw, Jr.
Assistant Examiner—Harry Raduazo
Attorney, Agent, or Firm—Chernoff & Vilhauer

[57] ABSTRACT

A construction set is comprised of a plurality of hollow 26 faceted joint elements with the facets being arranged in a selected orientation and having an opening, located in each facet, which is configured for receiving an elongate strut for interconnecting a plurality of the joint elements to form a three-dimensional framework. The struts have clip fasteners at each end adapted for snap fitting engagement within the openings such that they are not separable merely by application of tensile force to the struts; and locking means are provided for preventing inadvertent disengagement of the struts from the joints.

Due to the particular geometrical configuration of the joint elements, the openings and the clip fasteners both are elongate in order to provide maximum clip strength without sacrificing the structural integrity of the joint elements. Panels configured for spanning any predetermined array of the struts have flexible tabs adapted for releasably snap fitting over the struts in a manner permitting perpendicular or diagonal joinder of adjacent panels to a common strut, forming either inside or outside corners.

6 Claims, 18 Drawing Figures

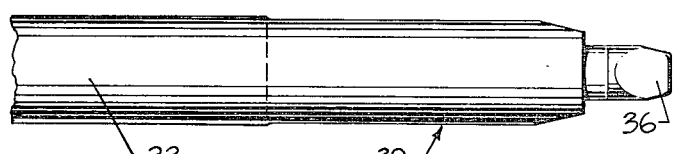
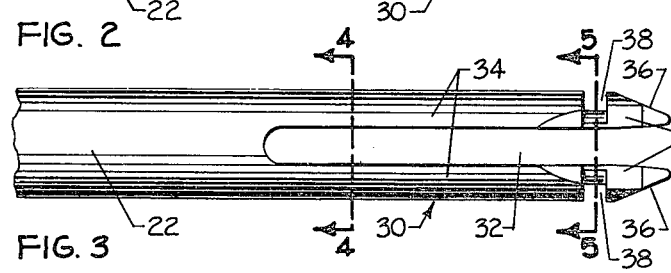
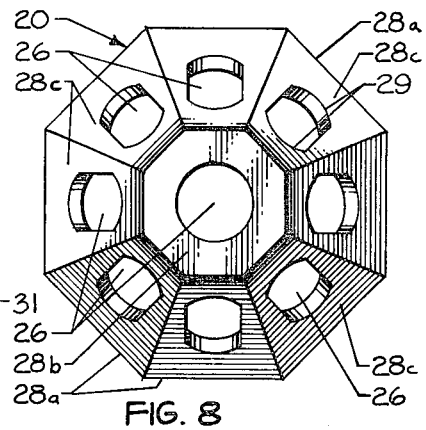
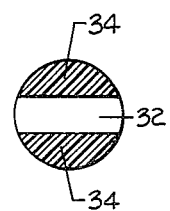
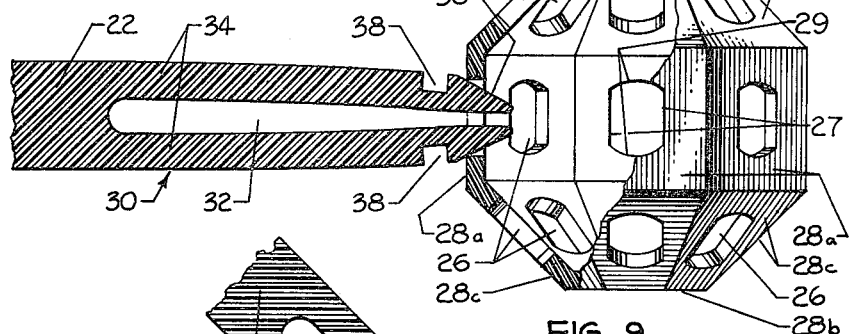
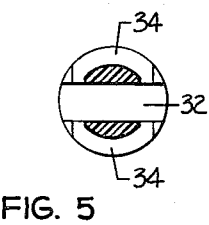
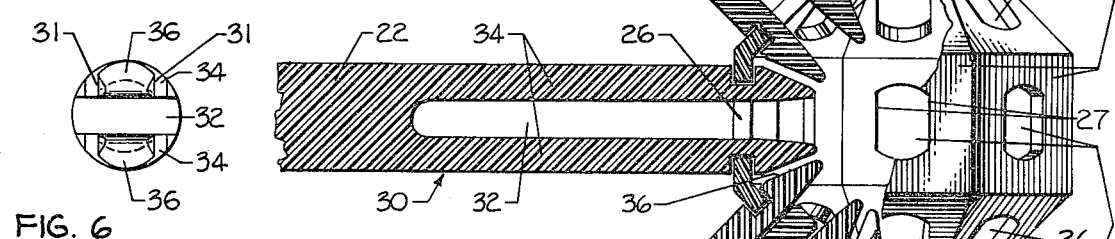
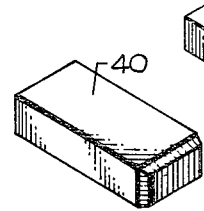
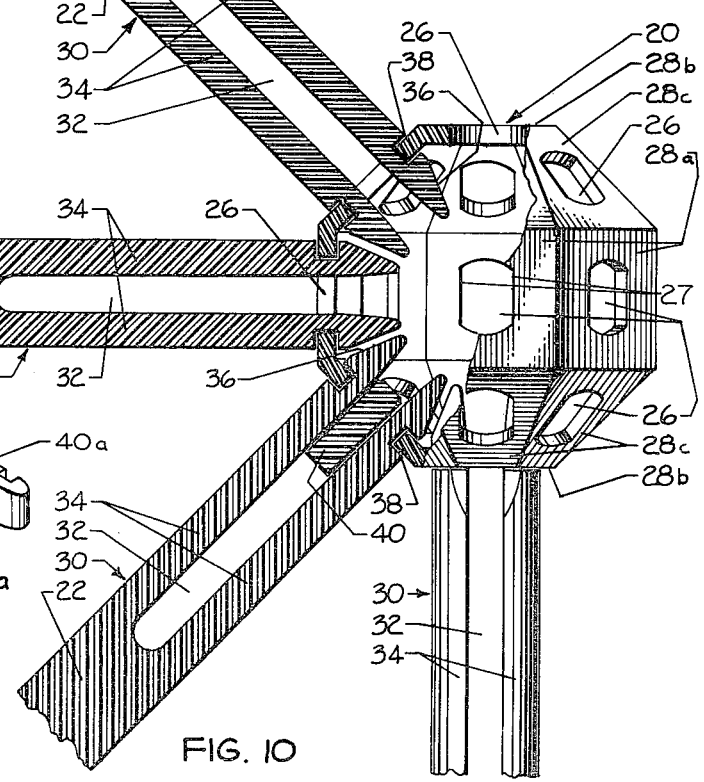

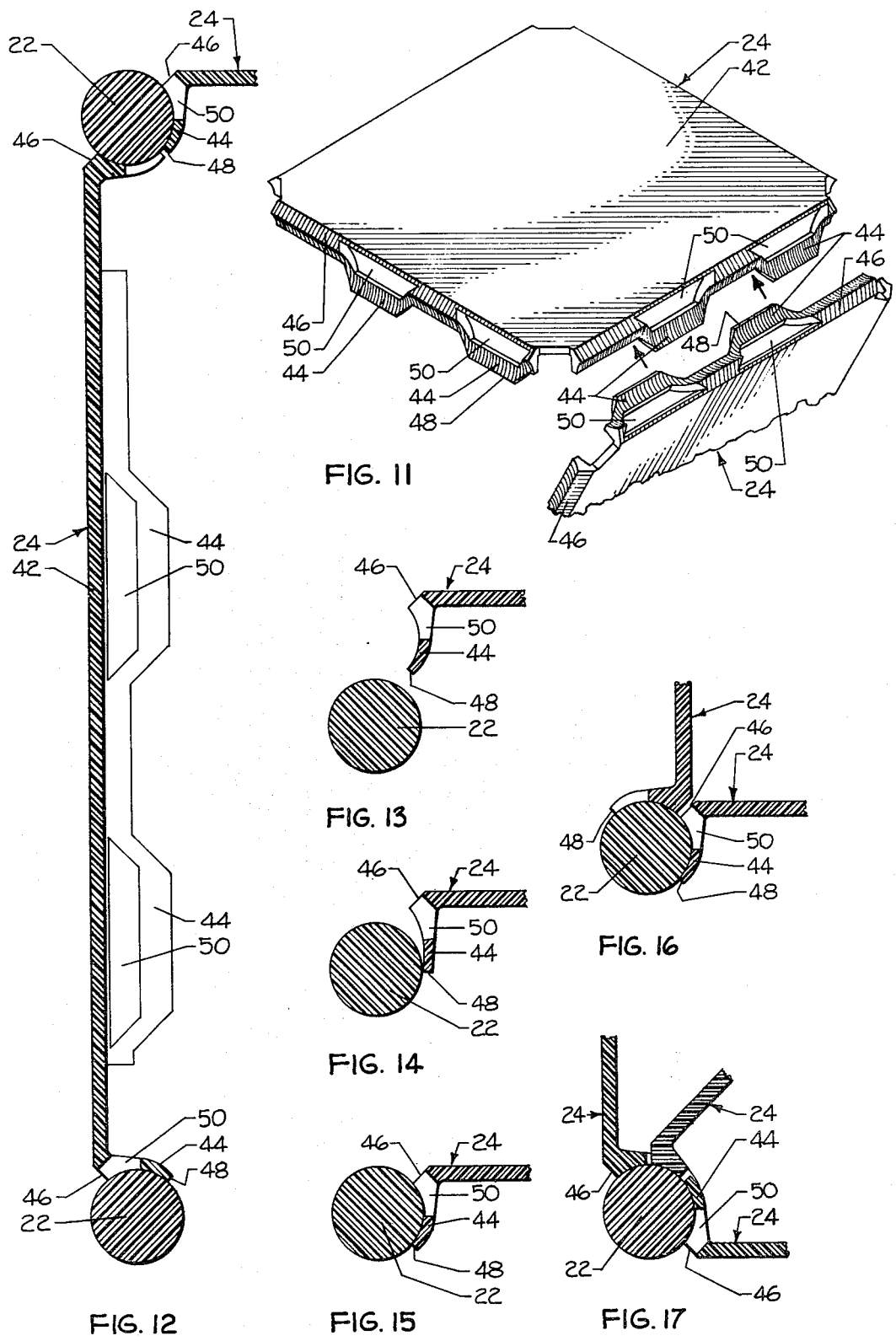

CONSTRUCTION SET HAVING CLIP FASTENERS

CROSS REFERENCE TO OTHER APPLICATIONS

This application is a continuation-in-part of application Ser. No. 775,916 filed Mar. 9, 1977 and now abandoned.

BACKGROUND OF THE INVENTION

This invention relates to a construction set and, in particular, to a construction set having struts and joint elements interconnected by clip fasteners.

Construction sets for constructing three-dimensional geometrical configurations, molecular models, display structures, furniture, toys, buildings and bridges, and other assemblies by means of joint elements and interconnected struts are legion in the prior art. Such a set is shown for example in Lullo U.S. Pat. No. 2,799,118. However, the prior art construction sets are limited in the type or types of geometrical shapes that can be constructed from them. For example, Lullo utilizes a six-sided element and thus is limited, in arranging his struts, to three mutually perpendicular planes. While Frye, U.S. Pat. No. 2,780,484 does disclose a joint element having diagonal planes as well, the element is still limited in that it only provides 14 or 18 faces. Thus, shapes such as a regular tetrahedron and the Great Pyramid cannot be formed.

SUMMARY OF THE INVENTION

In its basic concept, the construction set of the present invention comprises joint elements having 26 openings for releasably receiving interlocking snap fit clip ends of elongate struts for forming a three-dimensional framework which is not disassembleable upon tensile loading of the struts. The openings are located in individual faces, including eight rectangular faces circumscribing a common axis, eight first trapazoidal faces, each being interconnected to one edge of one of the rectangular faces and sloped diagonally inwardly at 45° with respect to the axis, eight second trapazoidal faces, each being interconnected to the opposite edge of one of the rectangular faces and sloped diagonally inwardly at 45° with respect to the axis, and two octagonal faces which are interconnected to the respective sets of trapazoidal faces and which are oriented perpendicular to the axis. Panels for partially or completely covering the resulting skeletal structure, have tabs located along each edge for snap fit engagement of the panel between a predetermined array of struts. The tabs are offset for placing adjacent panels on a common strut and are adapted for nesting of adjacent tabs when multiple panels are joined to a common strut.

It is an objective of the present invention to provide such a construction set which may be assembled into a wide variety of possible geometrical configurations.

It is another object of the present invention to provide such a construction set wherein the elements are joined merely by pushing them together.

It is a further object of the present invention to provide such a construction set wherein the elements can be locked together in a positive manner.

It is a still further object of the present invention to provide such a construction set which is adapted for constructing a structure which has the capability of spanning a distance and supporting a load.

It is a still further object of the present invention to provide such a construction set which can be used to construct a regular tetrahedron and the Great Pyramid.

It is yet a further object of the present invention to provide such a construction set allowing auxiliary elements to be attached thereto.

It is a still further object of the present invention to provide such a construction set having elements which are economical to manufacture.

The foregoing and other objects, features, and advantages of the principal invention will be more readily understood upon consideration of the following detailed description taken in conjunction with the accompanying drawings.

BRIEF DESCRIPTION OF THE DRAWINGS

FIG. 2 is a fragmentary plan view of one of the struts shown in FIG. 1.

FIG. 3 is a fragmentary side elevational view of the strut of FIG. 2.

FIG. 4 is a sectional view taken on the line 4—4 of FIG. 3.

FIG. 5 is a sectional view taken on the line 5—5 of FIG. 3.

FIG. 6 is an end elevational view of the strut of FIG. 2.

FIGS. 7 and 7a are pictorial views of locking means used in the present invention.

FIG. 8 is a plan view of one of the joint elements shown in FIG. 1.

FIG. 9 is a side elevational view of a joint element, showing one strut partially installed therein, partially broken away to show details of hidden construction.

FIG. 10 is a side elevational view of a joint element, similar to that of FIG. 9, showing several of the struts completely installed therein.

FIG. 11 is a fragmentary perspective view of the panels shown in FIG. 1.

FIG. 12 is a sectional view taken on line 12—12 of FIG. 1.

FIGS. 13, 14, and 15 are sectional detail views of one of the struts of the present invention, showing the sequence of a panel being installed thereon.

FIG. 16 is a detailed sectional view of one of the struts of the present invention showing two panels joined thereon.

FIG. 17 is a detailed sectional view of one of the struts of the present invention showing multiple panels installed thereon.

DETAILED DESCRIPTION OF A PREFERRED EMBODIMENT

Figure 1:
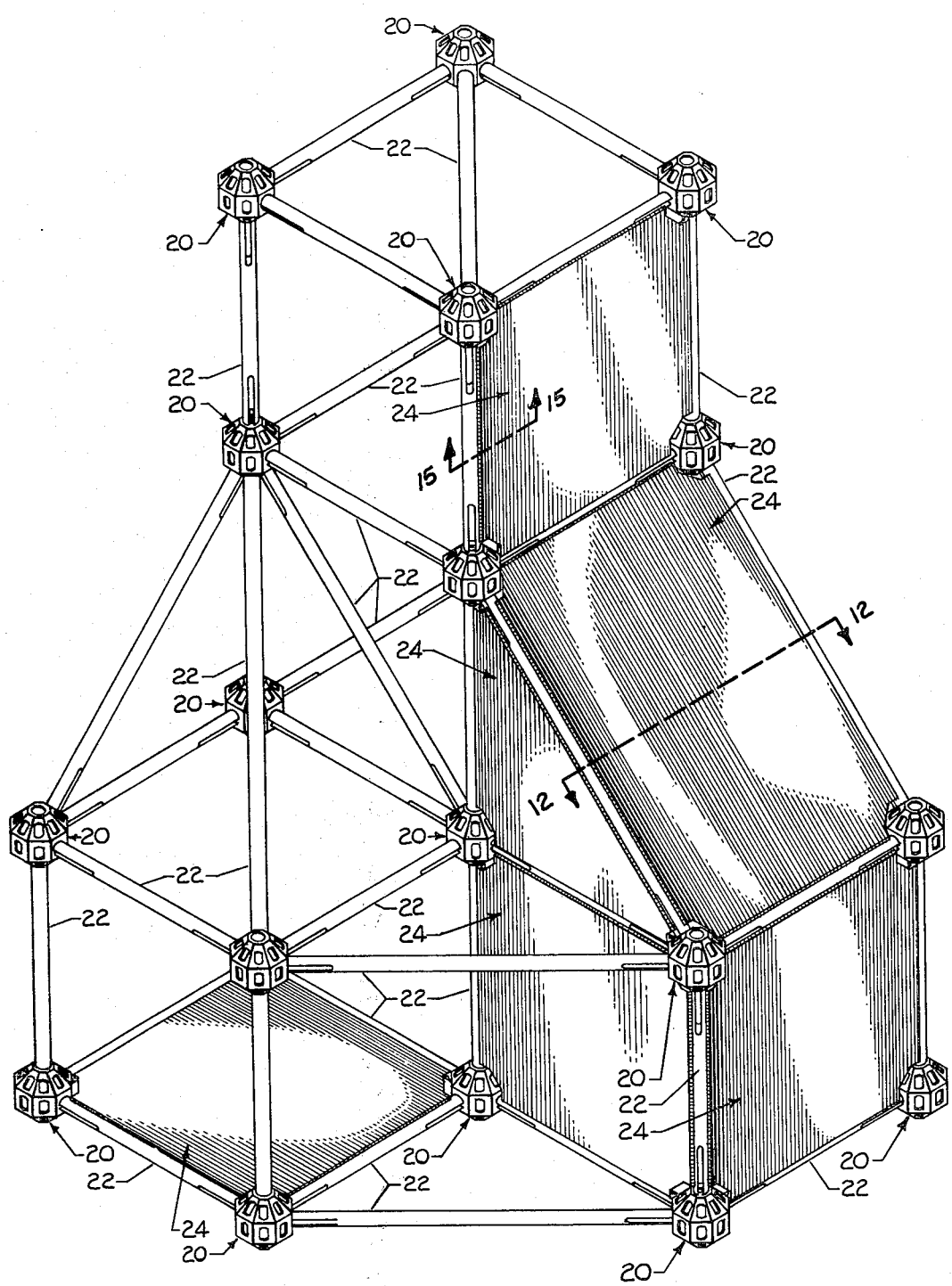
FIG. 1 is a pictorial view showing a preferred embodiment of the construction set of the present invention.

Referring to FIG. 1 of the drawings, the construction set of the present invention generally comprises joint elements 20 which can be releasably interconnected in three mutually perpendicular dimensions, and diagonally thereto, by struts 22 to form a framework which in turn can be partially or fully enclosed by planar panels 24.

In the embodiment illustrated, joint elements 20 are symmetrical multi-faceted hollow bodies having an opening 26 passing through each of 26 faces 28, FIGS. 8, 9 and 10. Each joint element is octagonal in plan, FIG. 8, with eight equally spaced rectangular faces 28a circumscribing a common axis and two octagonal faces 28b located oppositely each other in a second plane which is perpendicular to the axis. Interconnecting the rectangular faces and each octagonal face is a set of eight equally spaced trapazoidal faces 28c, each of which is oriented at a 45° angle with respect to the axis.

Thus an element is formed wherein the center of every one of the joint openings, on its associated facet, is located equidistant from the geometrical center of the joint element. In addition if the joint element is cut by any plane which is perpendicular to the axis a regular octagon will be formed. Finally every facet in the element is arranged such that it is perpendicular to a radial line projecting from the center of the joint element through the center of its associated joint opening. While any hollow body, such as for example a sphere, having similarly arrayed openings would appear to be geometrically similar to the subject joint element, the 26 faceted body shown allows constructing a three-dimensional framework which securely engages the struts due to the action of the clip element as will be more fully explained later.

The openings in each of the facets, except those in the octagonal facets, are elongate and comprise substantially straight opposed perpendicular sides 27 and opposed arcuate ends 29, thereby providing a truncated circular opening. The openings in the octagonal facets are circular.

As mentioned, the joint elements are interconnected by elongate struts 22, FIGS. 1 and 2, which are illustrated as being cylindrical rods. Located at both ends of the struts are clips 30 which are adapted for releasably connecting the struts to the joint elements by insertion into openings 26. The clips are also cylindrical having the same diameter as strut 22, except that they have opposed truncated sidewalls 31 configured to communicate with sides 27 in opening 26. Medial slots 32 are located in each of the extremities of the struts, bifurcating them into paired inwardly defectable prongs 34. The struts are configured such that the effective diameter of the prongs is slightly greater than the effective diameter of ends 29 and the separation of sidewalls 31 in slightly less than the separation of sides 27.

Located on the radial outward vaces of the extremities of the prongs are inclined ramps 36, having overall terminal diameters configured for inserting freely into the openings. Accordingly prongs 34 are deflected inwardly, FIG. 9, due to the action of the ramps as the clips are forced into the openings. Once the clips are fully inserted they are seated and retained by radially outwardly facing notches 38 which are located on the prongs at the inner margins of the ramp, and which are configured for receiving the edges of the openings, thereby allowing the prongs to return to their normal positions, FIG. 20. Thus, once seated the struts cannot be removed merely by the application of tensile force. Locking means, such as wedges 40, FIGS. 7 and 10, are adapted for being inserted into slot 32 coplanar with openings 26, thereby preventing inward deflection of the prongs to disengage notches 38 from the openings. Accordingly the struts can be locked securely to the joint elements preventing their accidental release unless the wedges are removed. If desired a more sophisticated locking means, such as second clip 40a, can be used. Second clips 40a have paired prongs, a medial slot, inclined ramps, and outwardly facing notches similar to clips 30. Accordingly, they can be locked into joint elements 26 similarly to clips 30, only at right angles thereto, to securely fix the elements in place.

Referring now to FIGS. 11 and 12, panels 24 which are shown as having thin planer medial platforms 42, are adapted for spanning between sets of struts located in an array corresponding to the particular shaped panel. Located along the ends of the panels are spaced joinder tabs 44 which are flexible enough to be bent substantially straight from their normally arcuate shape so that the panels can be secured between sets of struts in the manner shown sequentially in FIGS. 13, 14 and 15. The intersection between platforms 42 and tabs 44 comprises beveled margins 46 which are adapted to be in radial alignment with the struts allowing two of the panels to be attached to the same rod perpendicularly back to back, thereby forming an inside corner as shown in FIG. 16. Also, tabs 44 have end surfaces 48 at their extremities which align radially with the struts permitting two of the panels to be attached to a common strut perpendicularly end to end, thereby forming an outside corner as shown at the top of FIG. 12.

The tabs located along opposite edges of a panel are offset with respect to each other, permitting interdigital registry of the tabs of adjacent panels which are joined to a common shaft, FIG. 11. Further, notches 50 are located behind the tabs allowing the tabs from adjacent panels to nest as shown in FIG. 17.

OPERATION

The elements of the present invention can be joined to form a multiplicity of geometrical structures typical of that shown in FIG. 1. It will be noted that due to the shape of joint elements 20, struts 22 can be inserted into them for forming three mutually perpendicular planes and the diagonals to those planes.

A strut is attached to a joint element by inserting clip 30 into one of the openings 26. Referring to FIG. 9, it will be seen that the leading edges of ramps 36 just fit into the opening, causing prongs 34 to be deflected inwardly into slot 32 as the strut and joint element are urged together. When notches 38 become coplanar with the opening, the prongs expand outwardly to their relaxed positions with the respective face 28 of the joint element being engaged by the notches, thereby preventing removal of the strut merely by applying tensile force, FIG. 10. The locking action thus achieved is made possible by the planar faces of facets 28. In counterdistinction, if a joint element without flat faces is used the faces do not engage notches 38 at right angles and thus provide a loose fit which is likely to become disengaged. If desired locking means 40 or 40a can be inserted into slot 32, coplanar with the notches to lock the clip positively in place.

It will be noted that by truncating sidewalls 27 of the openings in the joinder element and sides 31 of the clip, an opening and clip having an effective diameter which would otherwise be too large to fit on the facet of the joinder element can be provided. This is noted particularly on the trapazoidal facets 28c which are limited in their transverse dimension. Otherwise, the clip would have to have a smaller effective diameter and thus would be considerably weakened, or else a large joinder element would be required which would be cumbersome in use and limit the desirability of the construction set.

Also, due to the arcuate ends of the clips, a strut will resist rotation when one of its clips is inserted into an elongate joint opening, but will freely rotate when a clip is inserted into a circular joint opening. Accordingly, it is possible to build rigid structures which have rotatable elements, such as an axle, with a single configuration of joint elements and clips.

Referring to FIGS. 13, 14 and 15, once the desired framework is formed the panels are installed where desired by manually deflecting tabs 44 on each side of a panel inwardly over the adjacent strut 22, and then releasing them to secure the panel in place on the strut. Referring to FIG. 11, the offset positioning of the tabs on opposite sides of the panel permits placing the tabs of adjacent panels interdigitally on a common strut, while beveled margins 46 and end surfaces 48 permit facing adjacent panels perpendicularly to each other to form inside corners, FIG. 16, and outside corners, FIG. 12, respectively, and notches 50 allow nesting of the tabs in multiple panel installations, FIG. 17.

To disassemble the structure, panels 24 are removed by pulling them outwardly from the struts. The struts are then removed from the joint elements, after removal of locking wedges 40 or 40a, by depressing prongs 32 inwardly. It will be noted that due to the positive interlock of the clips with the joint elements, the structure can be partially disassembled selectively without disassembling the remainder of the structure.

The terms and expressions which have been employed in the foregoing abstract and specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. A construction set for forming three-dimensional models comprising:
   (a) hollow joint elements having multiple joint openings located therein, some of said joint openings being circular and some of said joint openings being elongate with substantially straight parallel sides and arcuate ends having a diameter equal to the diameter of said circular joint openings;
   (b) elongate struts adapted for interconnecting two of said joint elements, each strut having a clip located at each end, said clip being generally cylindrical in cross section with truncated side walls, for snug releasable joinder with said elongate joint openings when properly aligned therewith and rotatable joinder with said circular openings; and
   (c) the clips being elastically depressable for insertion into the joint openings, and having means for interlocking with the joint elements upon return to their relaxed positions when seated in the openings.

2. The construction set of claim 1 including locking means adapted for fitting snugly within said clips, coplanar with the openings in the joint elements preventing inward deflection of said clips.

3. The construction set of claim 2 wherein said locking means comprises a wedge.

4. The construction set of claim 1 wherein said clips comprise:
   (a) each of the extremities of the struts having a medial slot located therein;
   (b) paired prongs defining each side of the slot, having an overall transverse dimension slightly greater than the mating openings in the joint elements, the prongs being deflectable inwardly towards the slots;
   (c) inclined ramps located on the outside faces of the prongs, for facilitating inserting the prongs into the openings, and for causing the prongs to be deflected inwardly when they are inserted into the openings; and
   (d) an outwardly facing notch being located in each prong intermediate its ends arranged for engaging the joint element and permitting the prongs to return to the relaxed position when the clips are seated therein.

5. A construction set for forming three-dimensional models comprising:
   (a) hollow joint elements having multiple elongate joint openings located therein;
   (b) elongate struts adapted for interconnecting two of said joint elements, each strut having a clip located at both ends, said clip being elongate in cross section in a manner for snug releasable joinder with the joint openings when properly aligned therewith;
   (c) the clips being elastically depressable for insertion into the joint openings, and having means for interlocking with the joint elements upon return to the relaxed positions when seated in the openings; and
   (d) locking means adapted for fitting snugly within said clips, coplanar with the openings in the joint elements preventing inward deflection of said clips, said locking means comprising:
      (1) a second clip having a medial slot located therein with paired prongs defining each side of said slot, having an overall transverse dimension slightly greater than the mating opening in the joint elements, the prongs being deflectable inwardly toward the slot;
      (2) inclined ramps located on the outside surface of the prongs, for facilitating inserting the prongs into the openings, and for causing the prongs to be deflected inwardly when they are inserted into the openings; and
      (3) an outwardly facing notch being located in each prong intermediate its ends arranged for engaging the joint element and permitting the prongs to return to the relaxed positions when the second clips are seated therein.

6. A construction set for forming three-dimensional models comprising:
   (a) hollow joint elements having multiple elongate joint openings located therein;
   (b) elongate struts adapted for interconnecting two of said joint elements, each strut having a clip located at both ends, said clip being elongate in cross section in a manner for snug releasable joinder with the joint openings when properly aligned therewith;
   (c) the clips being elastically depressable for insertion into the joint openings, having means for interlocking with the joint elements upon return to the relaxed positions when seated in the openings; and
   (d) panels configured for removable joinder between predetermined arrays of the struts, said panels including flexible tabs adapted for adjoining the panels to the struts, the tabs being integrally attached to the edges of the panels substantially perpendicularly thereto and having outer faces adapted to conform to the struts, and having notches located behind the tabs, arranged for nesting of the tabs when adjacent panels are adjoined to a common strut.

* * * * *